(12) United States Patent
Coatantiec et al.

(10) Patent No.: US 6,982,669 B2
(45) Date of Patent: Jan. 3, 2006

(54) HYBRID INERTIAL NAVIGATION SYSTEM WITH IMPROVED INTEGRITY

(75) Inventors: Jacques Coatantiec, Bourg les Valence (FR); Patrice Guillard, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/488,941

(22) PCT Filed: Sep. 24, 2002

(86) PCT No.: PCT/FR02/03258

§ 371 (c)(1),
(2), (4) Date: Mar. 9, 2004

(87) PCT Pub. No.: WO03/029755

PCT Pub. Date: Apr. 10, 2003

(65) Prior Publication Data
US 2004/0239560 A1    Dec. 2, 2004

(30) Foreign Application Priority Data
Sep. 28, 2001  (FR)  ................................ 01 12546

(51) Int. Cl.
*H04B 7/185*   (2006.01)
(52) U.S. Cl. ............................ 342/357.14; 342/357.06; 701/213; 701/220
(58) Field of Classification Search .......... 342/357.01, 342/357.06, 357.14; 701/207, 213, 216, 701/220

See application file for complete search history.

(56) References Cited

U.S. PATENT DOCUMENTS

| 5,654,890 | A | * | 8/1997 | Nicosia et al. | ................. 701/16 |
| 6,161,062 | A | * | 12/2000 | Sicre et al. | ..................... 701/3 |
| 6,292,750 | B1 | | 9/2001 | Lin | |
| 6,424,914 | B1 | * | 7/2002 | Lin | ............................ 701/214 |
| 6,785,609 | B2 | * | 8/2004 | Suda | .......................... 701/216 |

FOREIGN PATENT DOCUMENTS

WO            00 48014 A        8/2000

* cited by examiner

*Primary Examiner*—Dao Phan
(74) *Attorney, Agent, or Firm*—Lowe Hauptman & Berner, LLP

(57) ABSTRACT

The invention relates to an internal platform hybridized with a GPS receiver. The hybridization is achieved through a Kalman filter through which a new hybrid position D-HYB is estimated on the basis of a noted deviation between pseudo-distance measure by the receiver between the receiver and the various satellites and corresponding distances computed by the inertial platform between the platform and the same satellites. In this filtering, the distance increment from one measurement instant to the next instant, between the pseudo-distance previously measured by the receiver on a satellite axis of a deviation and the new pseudo-distance measured by the receiver on a satellite axis of a deviation and the new pseudo-distance measured by the receiver on this axis, is the phase variation $\Delta\Phi=\Phi(t)-\Phi I$ $(t-1)$ of a digital oscillator between the two measurement instants, this variation being referred to distance along the satellite axis. The oscillator is that which makes it possible to slave the local carrier frequency in the receiver to the carrier frequency received from the satellite. Application to the measurement of position.

4 Claims, 4 Drawing Sheets

HYBRID INERTIAL NAVIGATION SYSTEM WITH IMPROVED INTEGRITY

CROSS-REFERENCE TO RELATED APPLICATIONS

The present Application is based on International Application No. PCT/FR02/03258, filed on Sep. 24, 2002, which in turn corresponds to FR 01/12546 filed on Sep. 28, 2001, and priority is hereby claimed under 35 USC §119 based on these applications. Each of these applications are hereby incorporated by reference in their entirety into the present application.

FIELD OF THE INVENTION

The invention relates to instruments for aiding navigation and piloting, and in particular to those which are intended for aerial navigation in which the constraints regarding accuracy in position and speed are high and in which the integrity of the information given by the position and speed measuring instruments must be ascertained at every moment.

The use of inertial navigation platforms in aircraft is very conventional today. These platforms use accelerometers to determine accelerations along axes defined with respect to the aircraft, gyrometers to determine angular speeds of rotation with respect to axes likewise defined with respect to the aircraft, and possibly other sensors such as a baroaltimeter. By integrating the gyrometric measurements, one determines the orientation of the aircraft at a given moment; by integrating the accelerometric measurements, which may be referred to a terrestrial reference frame outside the aircraft by virtue of the knowledge of the orientation of the aircraft, one determines the aircraft's velocity components in this terrestrial reference frame. By integrating the velocities, one determines geographical positions.

BACKGROUND OF THE INVENTION

Measurement sensors are however imperfect and exhibit intrinsic errors or measurement bias, which may moreover vary during navigation. Furthermore, they are subject to measurement noise, in the sense that random variations not corresponding to the variations in the measured quantity get superimposed on the useful signal, representing the physical quantity sought. The electrical measurement signals are furthermore processed by electronic circuits which themselves introduce noise.

The bias and measurement noise are all the more detrimental since the position computations made on the basis of the measurement results from the sensors involve integrations. The integration gives rise to a drift in the measured value, which drift increases progressively over time when the integrated value is biased at the start. Double integration (integral of acceleration to give the speed followed by integral of speed to give the position) further increases this drift in considerable proportions.

To summarize, inertial platforms are very accurate over a very short duration but are subject, owing to the systematic time integration of the biases, to a sizeable drift which makes it necessary to reset them periodically on the basis of other position information (or speed information).

A mode of resetting that has long been used has consisted in using a network of ground beacons to provide aircraft overflying them with position signals making it possible to reset their navigation instruments.

More recently, inertial platforms have begun to be reset on the basis of satellite based positioning receivers carried onboard aircraft and deriving position and speed information, in a terrestrial reference frame, from signals that they receive from the satellites.

Hybrid platforms are thus produced that profit both from the excellent very short term measurement quality of inertial platforms (measurement hardly affected by noise) and from the high geographic position accuracy offered by satellite based positioning systems.

However, the position measurements made by satellite based positioning receivers are intrinsically greatly affected by noise in the short term, so that their measurements would have to be averaged in order to determine an accurate position; however, in a mobile vehicle, and especially an airplane moving rapidly, it is not possible to wait to average the measurements in order to obtain an accurate position since the airplane will have moved between two measurements.

Other problems may arise, such as changes of constellation of satellites observed by the receivers, that give rise to abrupt jumps in measured position, or faults with satellites that emit erroneous signals, or even faults with the inertial platform.

SUMMARY OF THE INVENTION

The hybridization of the two systems, inertial system and satellite based positioning system, to improve the quality of the position and speed measurements, poses difficult problems.

In general, one tries to best solve these problems through the use of filtering algorithms, generally known by the name Kalman filterings. This is a digital filtering performed during the computations that make it possible to determine a position known as the "hybrid position" on the basis of the information originating from the inertial platform and information given by the satellite based positioning receiver.

In case of loss or of degradation of the satellite based positioning measurements (in respect of which it should be recalled that they may easily be lost because the signal emitted by the satellites is extremely weak and that they may be erroneous, for example on account of the presence of multipaths between a satellite and the receiver), the Kalman filtering makes it possible to continue to compute a hybrid position which is of inertial type (that is to say analogous to one that would be provided by an inertial platform entirely on its own) but which is corrected of the platform's drift errors; specifically, the Kalman filter computes these errors continuously and can make use of the errors referenced just before the loss of the satellite signals to continue to correct the platform after this loss up to the moment at which the satellite signals become reavailable.

However, the accuracy and reliability of hybrid inertial platforms corrected by satellite based positioning receivers is not sufficient for certain applications, such as the automatic landing of aircraft. More generally, one wishes to constantly improve the accuracy of the measurements of position, of speed, of attitude, etc., of the vehicles, and it is moreover often necessary not only to give a position with accuracy, but also to ascertain the value of the accuracy associated with a measurement, given that this value is not fixed (it depends on a great number of parameters) and that it may be useful for enabling decisions to be taken. For example, in case of descent below a certain accuracy threshold, the aircraft's onboard computer can trigger an alarm intended to prohibit the carrying out of a landing.

One seeks in particular to be capable of giving a position with accuracy even if one of the satellites exhibits a defect such as a small clock drift. A satellite clock drift is a defect which is particularly difficult to detect through a satellite based positioning receiver and even through an inertial/satellite hybrid platform; specifically, the signals emitted by the satellite continue to exhibit all the appearances of intact signals. However they are erroneous, and the absence of any jump of position in the results provided periodically by the satellite based signals receiver implies that the fault is very difficult to detect. Nevertheless, it is necessary that the user or the onboard computer be alerted to this type of defect.

An aim of the present invention is therefore to improve hybrid inertial navigation platforms using satellite based positioning receivers, and most particularly those which provide not only a hybrid position but also a radius of protection around this position, inside which radius the integrity of the position is guaranteed with an error probability which is bounded by a defined upper value. This concept of radius of protection will be returned to in greater detail.

According to the invention, use is made of a Kalman filter (that is to say a filter employing prediction and resetting of estimation error, based on a model of temporal propagation of the errors of the system to be corrected and on a comparison with observed measurement values), whose particular feature is as follows: it uses as observed measurement values, to be compared periodically with predicted values, the differences between on the one hand the pseudo-distances measured by the receiver of satellite signals between this receiver and the various satellites and on the other hand the corresponding distances calculated by the inertial platform between the platform and the same satellites, the distance increment from one measurement to the next between the pseudo-distance previously measured by the receiver and the new pseudo-distance measured on a satellite axis being determined by a counting of the phase variation of the carrier frequency of the satellite signals from the previous measurement and not by an independent pseudo-distance measurement.

To do this, the filtering employing prediction and resetting of error uses, for each satellite axis, an initial position of the receiver, relative to the satellite, which is a position obtained by calculation on the basis of the temporal positions of pseudo-random codes present in the signals received from the satellites and it stores the phase of the carrier at the moment of this position measurement; and moreover, it uses, as new position of the receiver with respect to the satellite, during the next step of observation of the position of the receiver, not a new position measurement, but a simple modification of the previous position, by addition of the phase variation, in terms of number of phase revolutions and fraction of a revolution, referred to distance along the satellite axis, of the carrier frequency of the satellite signal.

Stated otherwise, the Kalman filters that could be proposed in the past, for inertial hybrid platforms reset by satellite positioning, generally use as observed position measurement, for resetting the inertial errors propagation model, a position variation in geographical axes, or a variation of pseudo-distances along the satellite axes, the variation of pseudo-distance resulting from the variations of temporal position of the local pseudo-random code of a channel of the positioning receiver. Here, the position increment between two resettings does not result from this variation of temporal position of the pseudo-random code, it results from the variation of phase of the carrier on each satellite/receiver axis.

It is recalled that a conventional satellite based positioning receiver comprises a feedback control of a local pseudo-random code for each channel corresponding to a satellite, and a feedback control of the phase of the carrier frequency of the satellite signal. This second feedback control, coupled with the first, serves in particular to take into account the Doppler effect induced by the relative speed of the receiver with respect to a satellite along the axis connecting the receiver to the satellite. The code feedback control uses a first digitally controlled oscillator to establish and synchronize the local code which allows the pseudo-distance determination, while the carrier feedback control uses a second digitally controlled oscillator which makes it possible to establish a local phase variation slaved to the phase of the carrier. These oscillators deliver a numerical phase value that increases by increments controlled by a computer which oversees the digital feedback control circuits. According to the invention, to observe the variations in distance between the receiver and a satellite with the aim of resetting an inertial platform through a satellite based positioning receiver, use is made of the digital output of the second digitally controlled oscillator and the variation in phase observed on the second oscillator, and referred to a distance of propagation of the satellite signal (whose frequency is known), is added to the distance previously calculated by the receiver.

Consequently, the invention proposes a navigation system comprising an inertial navigation platform hybridized with at least one satellite based positioning receiver, the inertial platform providing position information resulting at least in part from accelerometric and gyrometric measurements, and the receiver providing pseudo-distances representing the distance between the receiver and satellites, the receiver comprising, for each channel of the receiver, a digitally phase controlled oscillator slaved to the phase of a carrier of a satellite signal corresponding to this channel, and the navigation system providing hybrid position values resulting from a combination of numerical position data originating from the platform and numerical data originating from the receiver, the system comprising a means of estimating a new hybrid position on the basis of a noted deviation between on the one hand pseudo-distances measured by the receiver between the receiver and the various satellites and on the other hand corresponding distances computed by the inertial platform between the platform and the same satellites, this means comprising a digital filter, of Kalman filter type, allowing the prediction of a deviation and the matching of the filter as a function of the comparison between the noted deviations and predicted deviations, characterized in that, in the digital filter, the distance increment from one measurement instant to the next instant, between the pseudo-distance previously measured by the receiver on a satellite axis with a view to the noting of a deviation and the new pseudo-distance measured by the receiver on this axis, is the phase variation of the digital oscillator between the two measurement instants, this variation being referred to distance along the satellite axis.

The resetting of the inertial platform is therefore done by regularly observing the alterations in the phase of the carrier on each channel of the receiver, these alterations having the characteristic of hardly being affected by noise, and this will make it possible not only to obtain an accurate hybrid position but also to obtain an effective measurement of the accuracy of determination of the hybrid position, in the form of a calculation of a protection radius. The calculation of the protection radius is done according to the invention on the basis of the same Kalman filter, incremented in the manner indicated above.

The initial setting of the hybrid system is done in principle by giving the hybrid position an initial value which is a position calculated by the satellite based positioning receiver on the basis of the temporal position of the pseudo-random codes present in the signals from the various satellites.

A direct resetting (reinitialization of the inertial platform) by a new determination of a satellite position may be done when the actual radius of protection of the satellite based positioning receiver (which provides pseudo-distances with a certain protection radius depending in particular on the configuration of the currently observed constellation of satellites) becomes smaller than the radius of protection of the hybrid platform. This is why it is particularly advantageous to calculate both an actual radius of protection of the measurements provided by the receiver and a radius of protection of the measurements provided by the hybridized platform.

BRIEF DESCRIPTION OF THE DRAWINGS

Other characteristics and advantages of the invention will become apparent on reading the detailed description which follows and which is given with reference to the appended drawings in which.

DETAILED DESCRIPTION OF THE INVENTION

Figure 1:
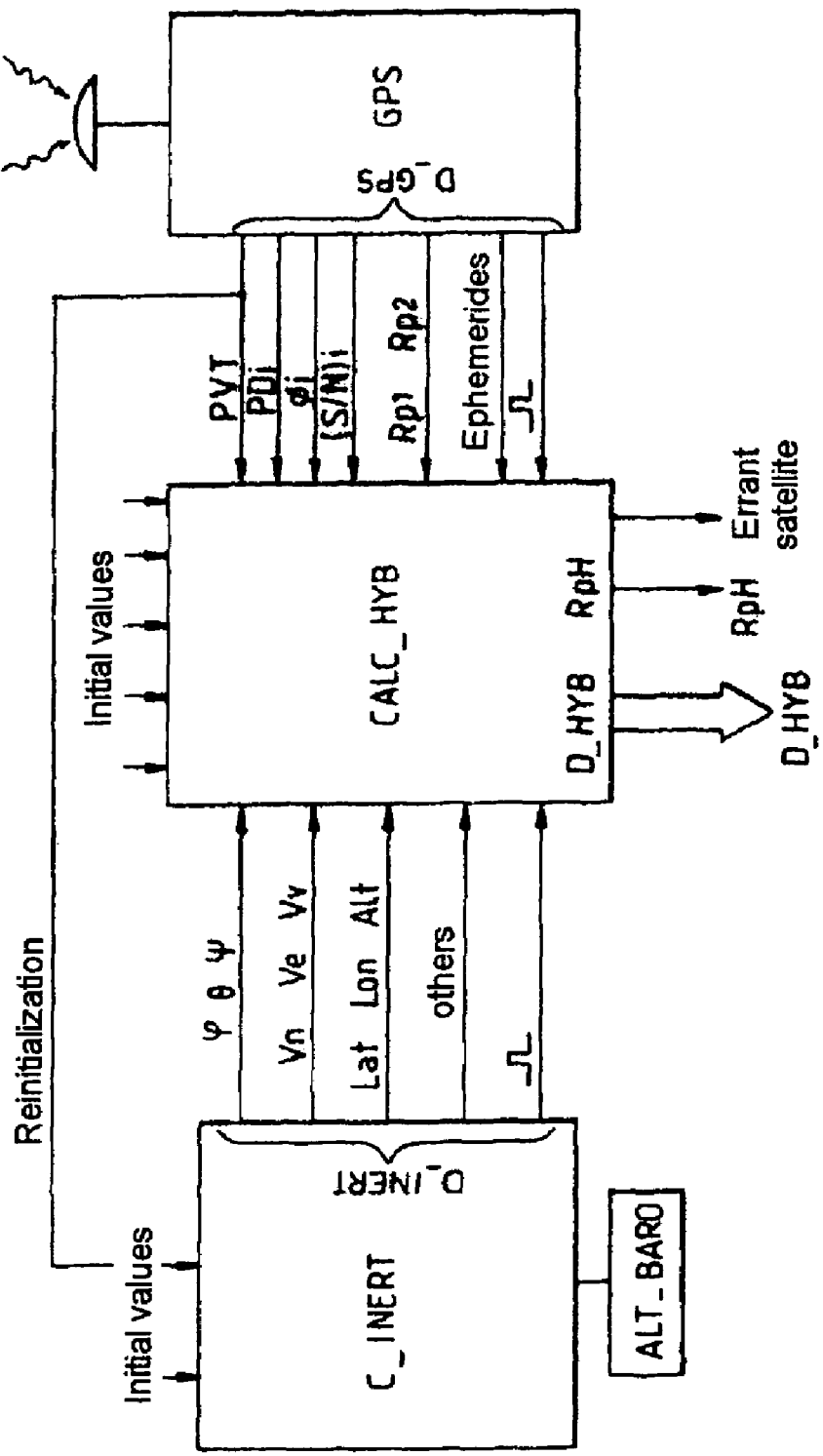
FIG. 1 diagrammatically represents the principle of a hybrid inertial platform according to the invention.

The hybridized inertial platform comprises an inertial platform proper C_INERT, a satellite based positioning receiver, that will be referred to subsequently as the GPS receiver with reference to the most common positioning system known as "Global Positioning System", and a hybridization electronic computer CALC_HYB.

The inertial platform C_INERT is usually composed of
- several accelerometers, typically three, with fixed orientations with respect to the aircraft, providing values of acceleration along these axes;
- several gyrometers, typically three, each having a fixed axis with respect to the airplane and providing values of speed of angular rotation about these axes,
- a computer which determines digital data relating to geographical position (Lat, Lon, Alt), geographical speed (Vn, Ve, Vv), heading roll and pitch attitudes ($\phi$, $\theta$, $\psi$), etc., on the basis of the indications provided by the accelerometers and gyrometers; the computer also provides a temporal marking pulse defining the instant at which these data are valid.

All these data, referred to hereinafter as raw inertial data D-INERT, are provided by the inertial platform to the hybridization computer.

Possibly, other sensors may be associated with the platform so as to refine the computations, such as a barometric altimeter (ALT-BARO). The computer of the inertial platform then uses the information from this or these additional sensors at the same time as the information from the gyrometers and accelerometers.

The GPS receiver conventionally provides a geographical position in terms of longitude, latitude and altitude, also referred to as the resolved position, also including a position measurement time. The receiver in principle also provides speeds of displacement with respect to the earth. The set consisting of this position, this time and this speed is referred to as the PVT point. A temporal marking pulse defining the instant of validity of the PVT point is also provided.

For its operation, the GPS receiver uses a measurement of distances between the receiver and each satellite in sight of the receiver. These distances are in reality pseudo-distances $PD_i$ (i designating a satellite number) obtained in the form of durations of signal propagation between the satellite of rank i and the receiver along the axis (satellite axis) joining the satellite and the receiver. It is the combination of the pseudo-distances on several satellite axes together with the knowledge of the positions of the satellites at a given moment (which knowledge is sent in the form of ephemerides by the satellites themselves) that makes it possible to compute the PVT resolved position.

The pseudo-distances $PD_i$ are therefore available in the GPS receiver and they will be used for the hybridization between the inertial platform and the GPS receiver. The resolved position information could naturally be used to carry out the hybridization by comparing the GPS resolved position with the position computed by integration in the inertial platform, but, as will be seen later, the use of pseudo-distances makes it possible to carry out the hybridization while taking account of possible faults or defects present in the signal emanating from a satellite.

The GPS receiver establishes other data too, and in particular the ephemerides representing the position of the satellites at any instant, a signal/noise ratio $(S/N)_i$ for each satellite, and one or more values of protection radius Rp1 (in terms of horizontal distance), Rp2 (in terms of vertical distance) which represent a measurement accuracy and to which we shall return later.

The GPS receiver provides the hybridization computer CALC_HYB with all these data, referred to hereinafter as D_GPS (GPS data).

The raw inertial data D_INERT and the GPS data are processed in the hybridization computer so as to provide hybrid inertial data D_HYB which are a hybrid attitude, a hybrid speed and a hybrid position. The hybridization computer also provides one or more values of protection radius RPH representing the accuracy of the data emanating from the hybridization. Finally, the computer can provide data for identifying an errant satellite and naturally may provide alarm signals when the computation of the radii of protection demonstrates insufficient reliability of the information provided.

For the implementation of the invention, the GPS receiver also provides the hybridization computer with an indication, for each satellite observed, of the phase $\Phi_i$ of the carrier of the satellite signal of rank i at the instant of observation.

The hybridization is achieved through Kalman filtering algorithms so as to obtain at one and the same time the qualities of stability and of absence of short-term noise of the inertial platform and the very high accuracy of the GPS receiver, although greatly affected by short-term noise. The Kalman filtering makes it possible to take account of the intrinsic errors of behavior of the inertial platform C_INERT, and to correct these errors. The measurement error of the inertial platform is determined during filtering; it is added to the measurement provided by the platform so as to give a hybrid measurement in which the errors due to the behavior of the platform are minimized.

Moreover, the implementation of a filtering algorithm, using the pseudo-distances emanating from the GPS receiver and the phases of the carrier of the satellite signals, is such that it is possible to determine the errant satellites, exclude them, and compute the radii of protection of the hybrid position both in the absence of satellite defect and in the presence of a defect.

The hybridization computer is therefore designed both to correct the errors inherent in the inertial platform and to take account of the defects of the spatial segment of the reception of the satellite signals.

It is also possible to envisage additional means for detecting (but not necessarily correcting) hardware defects of the inertial platform (unmodeled defects, that is to say faults) and hardware defects of the GPS receiver. These means consist in practice in envisaging redundant chains, with another inertial platform, another GPS receiver and another hybridization computer. This type of redundancy does not form the subject of the present invention and will not be described, but the invention may be incorporated in redundant systems as in nonredundant systems.

The hybridization is done in open loop, that is to say the inertial platform is not slaved to the data resulting from the hybridization.

In a general manner, it is necessary to introduce initial values into the inertial platform and into the hybridization computer. These initial values are given the first time with reference to an absolute reference frame: for example on departure of an airplane on the ground, motionless, in a known attitude and at a known position, this attitude and this position are introduced as initial values into the filter. Subsequently, during flight, the measurements provided by the inertial platform will be reinitialized from time to time as a function of the measurements provided by the GPS receiver.

The manner in which the Kalman filtering is implemented in order to combine information emanating from the inertial platform and information from the GPS receiver will now be described.

Figure 2:
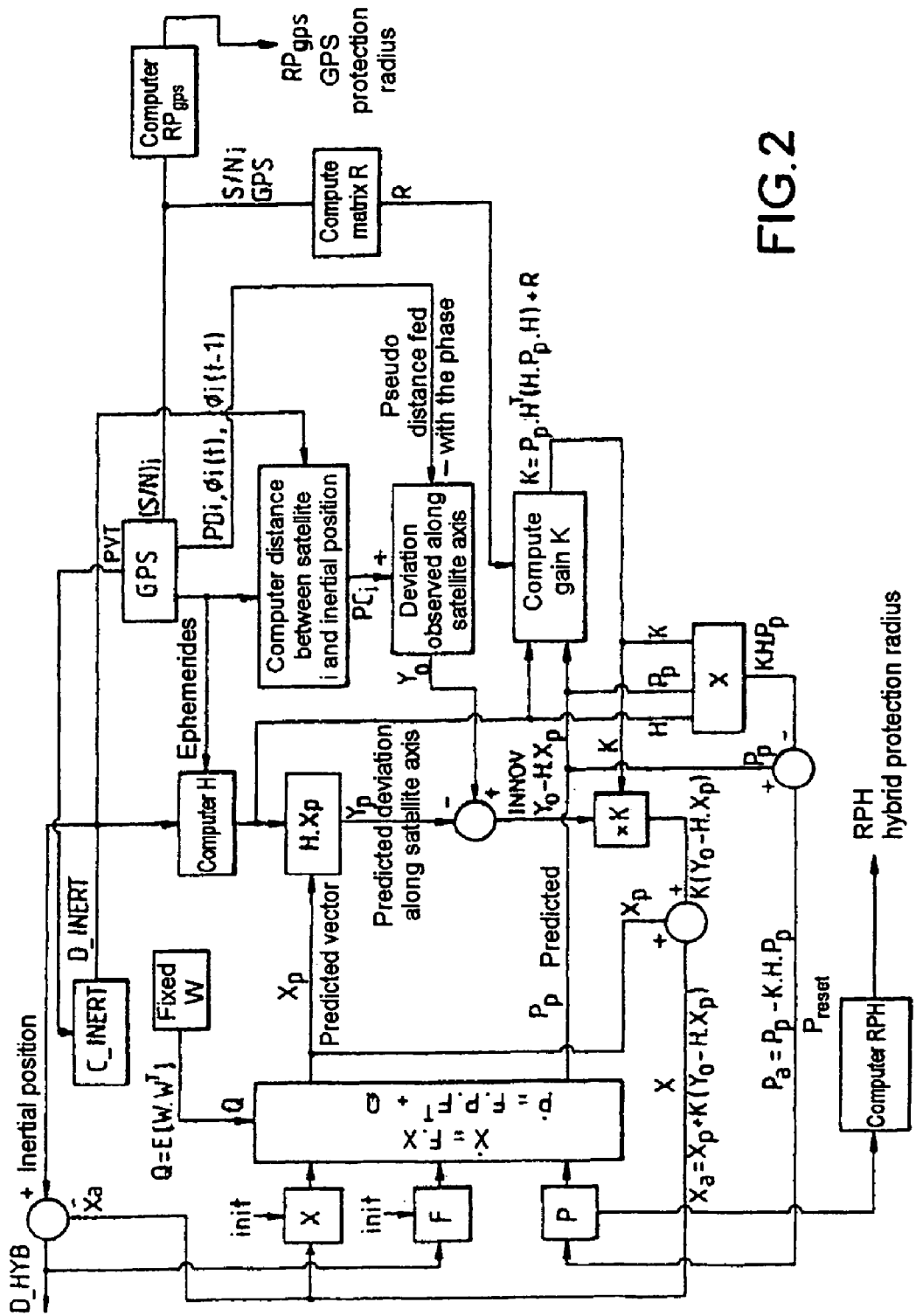
FIG. 2 represents a flowchart of the operation of the Kalman filter.

FIG. 2 represents a flowchart of the operation of this filtering (which is an algorithmic filtering implemented on digital data). The filtering which is described assumes that there are N satellites observed by the GPS receiver. As will be seen later, there will in fact be N+1 different Kalman filterings: on the one hand a main filtering, based on the measurements emanating from the N satellites, and leading to the correction of the measurements of the inertial platform, and N secondary filterings, each based on the reception of N−1 satellites only. Each secondary filtering corresponds to the exclusion of one and only one satellite, and the comparison of the results of the N secondary filterings and of the main filtering allows one to possibly reach the conclusion that a satellite is defective and even to the decision to exclude this satellite for the measurements which follow. The main filtering and the N secondary filterings are defined by N+1 computation programs operating either in parallel with N+1 processors, or under time sharing with a single processor or a reduced number of processors.

Given that the secondary filterings operate on the same principles as the main filtering, the only difference pertaining to the number of satellites observed, it is sufficient to describe the operation of the main filtering.

The principle of Kalman filtering is recalled:

The various causes of drift or of errors of the inertial platform C_INERT are known and may be modeled. The Kalman filtering consists in establishing, on the basis of this knowledge of the behavior of the platform in the presence of various causes of error, a state vector X representing the errors estimated in the various information components emanating from the inertial platform, and a matrix F representing the coefficients of propagation of these errors over time.

The error propagation model is expressed in the form of a law of propagation of the inertial errors, of the form $X'=F.X$ where $X'$ is the time derivative of the vector X. The error in a data item depends on the errors in the other data items, hence the matrix form of the propagation law.

The matrix F is a matrix of coefficients which are not necessarily constant and which may vary for example as a function of the output values of the hybrid inertial platform. The filter comprises the means of computation and of updating of the various terms of the matrix.

Moreover, the model of the behavior of the inertial platform is also defined by a covariance matrix (matrix P). The coefficients of this matrix represent the variance of each of the components of the state vector and the covariance of the various pairs of components of this vector. The matrix P represents as it were the degree of confidence allocated to the updated state vector. The covariance matrix P itself varies over time, the temporal propagation law for this matrix being of the form:

$$P'=F.P.F^T+Q,$$

Where P' is the time derivative of the matrix P; $F^T$ is the transpose of F; and Q is a variance matrix of a noise vector W having a noise component for each data item of the state vector X. This vector W is a white noise vector making it possible to quantify the approximations made in the modeling for each component of the state vector X.

Finally, for the hybridization proper, a predicted vector Yp is established, this being a linear combination $Yp=H.Xp$ of a prediction Xp of the state vector X (the coefficients of the linear combination varying over time); and the components of the predicted vector Yp are compared with similar components of a vector Yo observed with the aid of the GPS receiver and of the inertial platform. The term H is a matrix representing the coefficients of the linear combination; to elucidate the nature of this matrix, the following thing may be said: if the GPS receiver provides pseudo-distances observed between the receiver and a satellite, hence along satellite axes, and if one wishes to make use of these observed pseudo-distances to reset the hybrid position, then the Kalman filter must comprise computation means for establishing predicted "pseudo-distances" along the satellite axes, before detecting a deviation between the predicted pseudo-distances and the pseudo-distances observed along the same axes. It is the role of the matrix H to convert certain components of the state vector X (which a prior are not distances along the receiver/satellite axes) into distances along the receiver/satellite axes.

In the Kalman filter that will be used in practice, the components of the state vector X are the deviations between reality and the data provided by the inertial platform before hybridization. Stated otherwise, if $\phi$, $\theta$, $\psi$, Lat, Lon, Alt, are six attitude and position data items provided by the inertial platform C_INERT (there are in practice still other data provided by the inertial platform), the state vector X consists of a column of components $\delta\phi$, $\delta\theta$, $\delta\psi$, $\delta$Lat, $\delta$Lat, $\delta$Alt, etc., representing the deviations between the exact values and the values actually provided by the inertial platform C_INERT.

The Kalman filter operates globally on the following general principle: on the basis of a current value of the state vector X and of the covariance matrix P of the state vector, the model for the propagation of the inertial errors (matrix F, differential equations of propagation) establishes a predicted state vector Xp; this vector is transformed into a predicted observable vector Yp; the GPS receiver and the inertial platform provide data that make it possible to compute an observed vector Yo; the predicted observable vector Yp and the observed vector Yo are compared; the difference, multiplied by a gain matrix K computed from the matrix P, serves to compute a new estimate Xa of the state vector X and a new estimate of the matrix P; this estimate Xa will be substituted for the previous value of the state vector so as to become a new current value of the state vector; this substitution is the operation of resetting the model, performed periodically; likewise, an estimate Pa of the matrix P will be substituted for the previous value. Finally, with the new value of the state vector, the data D_INERT provided by the inertial platform are corrected to produce corrected data or hybrid data D_HYB at the output of the hybridized platform. The correction at this juncture is a simple addition between the raw data D_INERT provided by the inertial platform and the state vector Xa which represents the current estimate of the errors produced by the inertial platform.

The values observed (vector Yo) by the hybridized inertial platform, which are established with a view to comparison with values Yp predicted by the Kalman filter, are then deviations between data provided by the GPS receiver and comparable data provided by the inertial platform. These deviations are, as far as the position measurements are concerned, distances along the axes connecting the platform to the satellites.

This is represented by the operating flowchart of FIG. 2. The details of the manner of operation will now be described.

The model for the propagation of the inertial errors is represented by the matrix F, the matrix P, the matrix Q, the state vector X, and the differential equations $X'=F.X$ and $P'=F.P.F^T+Q$.

The matrix F has fixed coefficients and others which depend on the position at which the platform is located; these latter coefficients are therefore periodically updated as a function of the hybrid data D_HYB emanating from the hybridized platform, that is to say resulting ultimately from the computations done by the hybridization computer.

On departure, the state vector X is initialized to zero. The hybrid output data D_HYB are preferably initialized to values provided either by the GPS receiver, or by known data (airplane motionless on the ground, of which both the geographical position and the attitude are known).

The matrix P is initialized with the variances and covariances known at the place where the initialization is done, in particular those related to the GPS receiver.

The differential equations of the model thus initialized involve the matrix F, the matrix P and the matrix Q; they make it possible to determine a predicted vector Xp from the current vector X, and a predicted covariance matrix Pp from the current matrix P.

Of interest chiefly in what follows are the position components of the state vector, and hence only these components will be mentioned, given that the position is the most important element which justifies the hybridization between the inertial platform and the GPS receiver. Naturally, the reasoning is the same for the velocity components, and for other components of the state vector.

On the basis of the predicted vector Xp, converted into satellite axes by the matrix H, a predicted observable vector $Yp=H.Xp$ is computed. The matrix H is computed on the one hand from the ephemerides of the satellites, making it possible to determine the position of the satellites at a given instant, and on the other hand from the inertial position given by the inertial platform C_INERT. The predicted vector Yp corresponds to predicted errors, referred to satellite axes.

The predicted errors Yp are compared with the errors actually observed Yo. The errors observed comprise position components $Yo_i$, on each satellite axis; these components consist of a difference between the receiver-satellite distance $PD_i$ as measured by the GPS receiver and the inertial platform/satellite distance $PC_i$ computed from the inertial position given by the platform C_INERT and the ephemerides detected by the GPS receiver.

$$Yo_i=PC_i-PD_i$$

The difference, at each resetting operation, between the predicted vector Yp and the observed vector Yo, is the vector quantity serving for the reset. This difference is called the innovations vector:

$$INNOV=Yo-Yp=Yo-H.Xp$$

It represents the fact that the prediction is not perfect since Yp was predicted and Yo is observed, and that the state vector Xp and the predicted matrix Pp must be modified so as to get closer to a state vector X and a matrix P which properly model the actual behavior of the inertial platform.

The innovations (components of the vector INNOV) are not applied in an abrupt manner to the predicted state vector Xp to construct a new current vector X. On the contrary, only a fraction of the innovations (fraction less than 1) is applied to the predicted vector to construct an updated vector, and it is only gradually, progressively with the gradual resets, that the predicted vector will get closer to the observed vector Yo.

A gain matrix K is therefore calculated so as to determine, for each component of the state vector, a respective gain less than 1, representing the fraction of innovation that will be added to the predicted component to define an updated component of the state vector.

The equation for updating the state vector from X to Xa is then:

$$Xa=Xp+K.(Yo-Yp)$$

The matrix K is calculated by taking account of the matrix H, so as to reconvert into the reference frame of the state vector X the innovations Yo−Yp which are in satellite axes. Furthermore, the gain matrix is computed from the predicted variance matrix Pp, the gain allocated to the innovations so as to converge to the best possible hybrid solution being dependent on the confidence that one has in the exactness of the state vector.

The computation of the matrix K is done through the equation:

$$K=P.H^T[H.P.H^T+R]^{-1}$$

R is a matrix of noise components representing the inherent noise of the GPS receiver when this noise can be measured by the GPS receiver. For this purpose, a signal/noise ratio $(S/N)_i$ data item is preferably provided by the GPS receiver for each satellite. The noise is easily measured by a correlator not aligned with the pseudo-random code which modulates the satellite signal, this correlator receiving the satellite signals and other signals present in the same frequency band, the whole representing the noise.

The computation of the gain matrix K is redone at each resetting operation, the gains in the innovations along the axes of the state vector varying over time not only due to changes in the covariance matrix, but also due to changes in the orientation of the satellite axes.

The updated state vector Xa will replace the previous state vector X upstream of the model for the propagation of the inertial errors, for the computation of a new error prediction and so on and so forth.

In parallel with the computation of an updated state vector, an updated covariance matrix Pa is computed from the predicted covariance matrix Pp. The computation of the updated matrix Pa results from the formula:

$$Pa=Pp-K.H.Pp$$

The updated matrix Pa will replace the covariance matrix P at the input of the inertial error propagation model, with a view to a new prediction and a new resetting.

It is on the basis of the updated state vector Xa, which is a vector estimating the errors of the inertial platform, that the hybrid solution is computed: the components of the hybrid solution (position, attitudes, speeds, etc.) are obtained by adding to the corresponding components provided by the inertial platform (raw inertial data) the updated estimate Xa of the errors due to the inertial platform:

$$D\_HYB=D\_INERT+Xa$$

In parallel, it is on the basis of the updated covariance matrix Pa that it is possible to compute a radius of protection of the hybrid measurements: the matrix Pa makes it possible to compute a radius of protection of the hybrid measurement directly on condition that there is no fault. This computation of protection radius will be made explicit later.

However, as stated, if in addition to the main Kalman filtering algorithm just described, one also envisages N secondary algorithms excluding a satellite axis on each occasion, this is to also allow determination of an errant satellite, the exclusion of this errant satellite, and the determination of an associated protection radius in the presence of a fault. These matters relating to radii of protection will be returned to later.

For this Kalman filtering algorithm, both the main algorithm and the secondary algorithms, it is envisaged that the differences $Yo_i=PC_i-PD_i$ be computed, these being, on each nonexcluded satellite axis of rank i, the difference between the receiver/satellite distance measured by the inertial platform and the same distance measured by the GPS receiver.

According to the invention, for this computation of the observed measurement quantity Yo, the distance measured by the GPS receiver on satellite axis i is obtained, from one reset operation to the next, by adding to the distance previously observed a distance corresponding to the carrier phase variation of the satellite signal between the current reset operation and the previous reset operation.

$$PD_i(t)=PD_i(t-1)+\lambda.\Delta\Phi_i/2\pi$$

where t is the time (counted in units corresponding to the duration separating two successive resets, for example one second); $PD_i(t)$ represents the distance computed at the moment of the current reset, $PD_i(t-1)$ therefore represents the distance computed upon the previous reset; $\Delta\Phi_i$ is the carrier phase variation observed between t−1 and t; λ is the wavelength (known) of the carrier of the satellite signal; $\lambda.\Delta\Phi_i/2\pi$ is the length, along the satellite axis of rank i, corresponding to the distance of propagation of the satellite signal for a phase variation $\Delta\Phi_i$.

Upon initialization of the system, the distance $PD_i(0)$ is the pseudo-distance measured by the satellite based positioning receiver, but, at the same time as this distance is computed, the value of the carrier phase $\Phi_i(0)$ at the instant of validity of the measurement is held in memory. Likewise, at each reset step, the value of the carrier phase $\Phi_i(t-1)$ is kept in memory with a view to the next step. During subsequent resetting steps, the phase variation is computed by simple differencing between the value $\Phi_i(t)$ of the current carrier phase and the previous value $\Phi_i(t-1)$.

$$\Delta\Phi_i=\Phi_i(t)-\Phi_i(t-1)$$

And it is this variation, multiplied by $\lambda/2\pi$ to reduce it to a propagation distance, which is added to the pseudo-distance previously computed to define the new pseudo-distance serving for the computation of the observed quantity $Yo_i$.

The phase $\Phi_i(t)$ is obtained on the basis of the content of a digitally controlled oscillator present in the feedback control circuit for slaving the carrier phase of each channel (there is one channel per satellite) of the GPS receiver.

Figure 3:
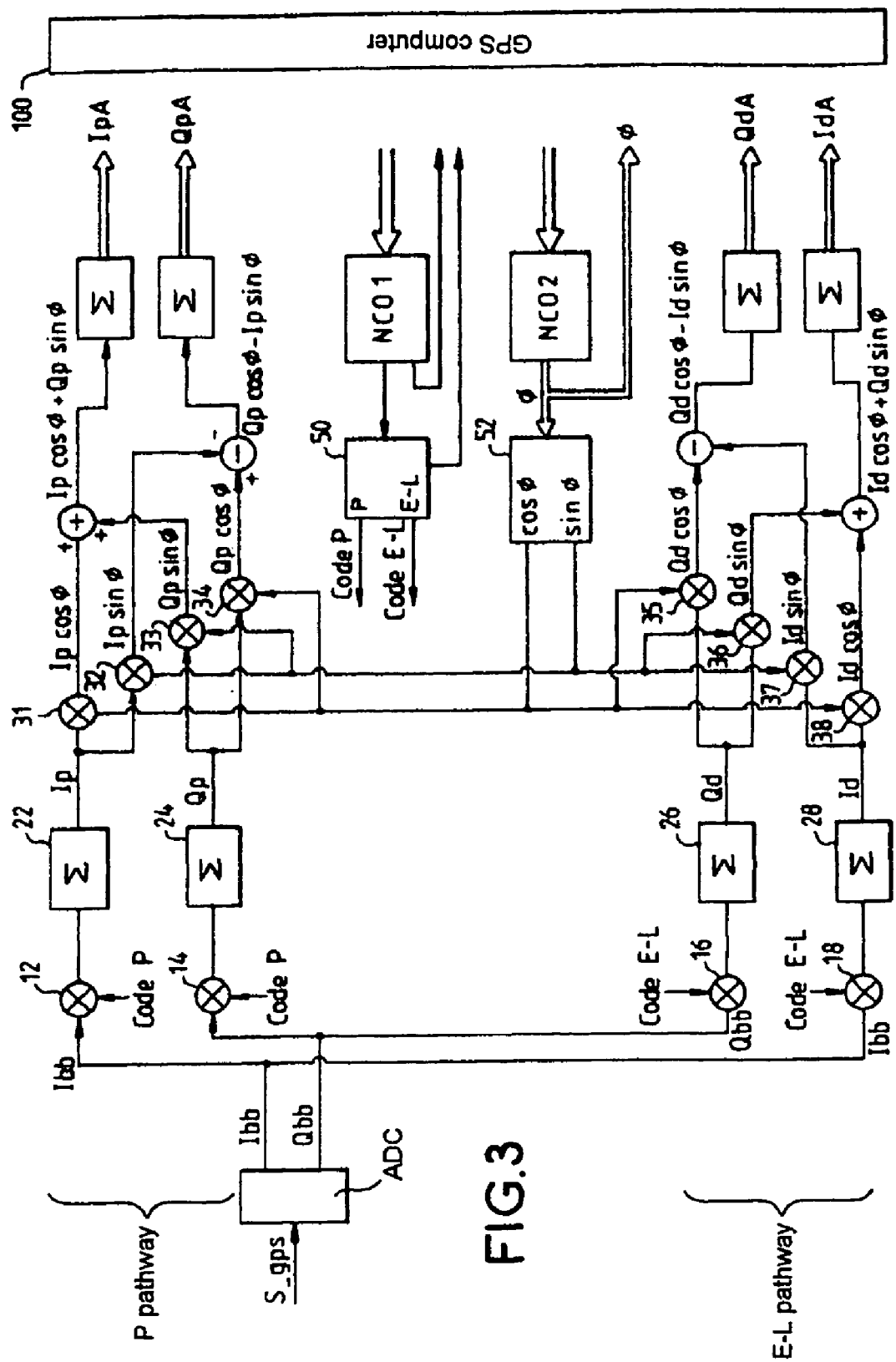
FIG. 3 represents the general structure of a satellite based positioning receiver, comprising a digitally controlled oscillator whose output represents the phase of the carrier of the satellite signal.

FIG. 3 represents an exemplary structure of a digital channel of a GPS receiver comprising such a phase feedback control circuit. All the GPS receivers currently comprise in each channel such a carrier phase feedback control circuit, and this circuit always comprises a digitally controlled oscillator to establish a sawtooth linearly varying phase representing at a given instant, due to the feedback control, the phase of the carrier of the satellite signal.

The radio signal S_gps emanating from the satellites and frequency transposed, is for example sampled by an analog/digital converter ADC, which provides periodic samples, in phase (Ibb) and in phase quadrature (Qbb). These samples are multiplied (multipliers 12, 14, 16, 18) by a pseudo-random code corresponding to the channel considered and hence to the satellite considered. Two different correlations may be performed simultaneously, one with a punctual code P (multipliers 12, 14) and the other with an early-late code E-L (multipliers 16, 18). The pseudo-random codes are produced by a local code generator 50 driven by a digitally controlled oscillator NCO1, itself controlled by a computer 100 associated with the GPS receiver. The results of the four multiplications are aggregated in respective accumulators 22, 24, 26, 28. The outputs Ip, Qp (correlation by punctual code P) and Id, Qd (correlation by difference code E-L) of the accumulators are multiplied (multipliers 31 to 38) by a value cos Φ and a value sin Φ representing respectively the cosine and the sine of the phase Φ of the carrier. The outputs from these multipliers make it possible to compute sums and differences of products, and periodic accumulations IpA, QpA, IdA, QdA, of these sums and products, which represent partial results of the correlation of the GPS signal with the code and the carrier that are generated locally in the channel. These results are provided to the associated computer and serve in return to drive the feedback control loop so as to align the punctual local code P with the code present in the satellite signal, and to align the local carrier phase with the phase of the satellite signal.

The local carrier phase is established by a second digitally phase controlled oscillator NCO2, which produces a sawtooth varying phase Φ. This phase is applied to a sine and cosine generator to establish the values sin Φ, cos Φ from the phase Φ present at the output of the local oscillator NCO2. It is this local oscillator output, transmitted moreover to the associated computer 100, which represents, at a measurement instant t, the phase $\Phi_i(t)$ of the carrier in the channel corresponding to the satellite of rank i.

The computation of hybrid position and the computation of the protection radii will therefore be done from one measurement to the next by observing the difference between the content of the oscillator NCO2 at the instant t and the content at the instant t−1 and by transmitting this difference to the Kalman filter according to what was explained above.

Having thus described the manner of operation of the Kalman filter in relation to the carrier phase variations observed on each satellite axis in the GPS receiver, we shall now return to the computation of the radius of protection of the hybrid data D_HYB. As was stated, this radius of protection is a very important measurement in certain applications where it is essential to ascertain the accuracy with which the data are obtained.

Figure 4:
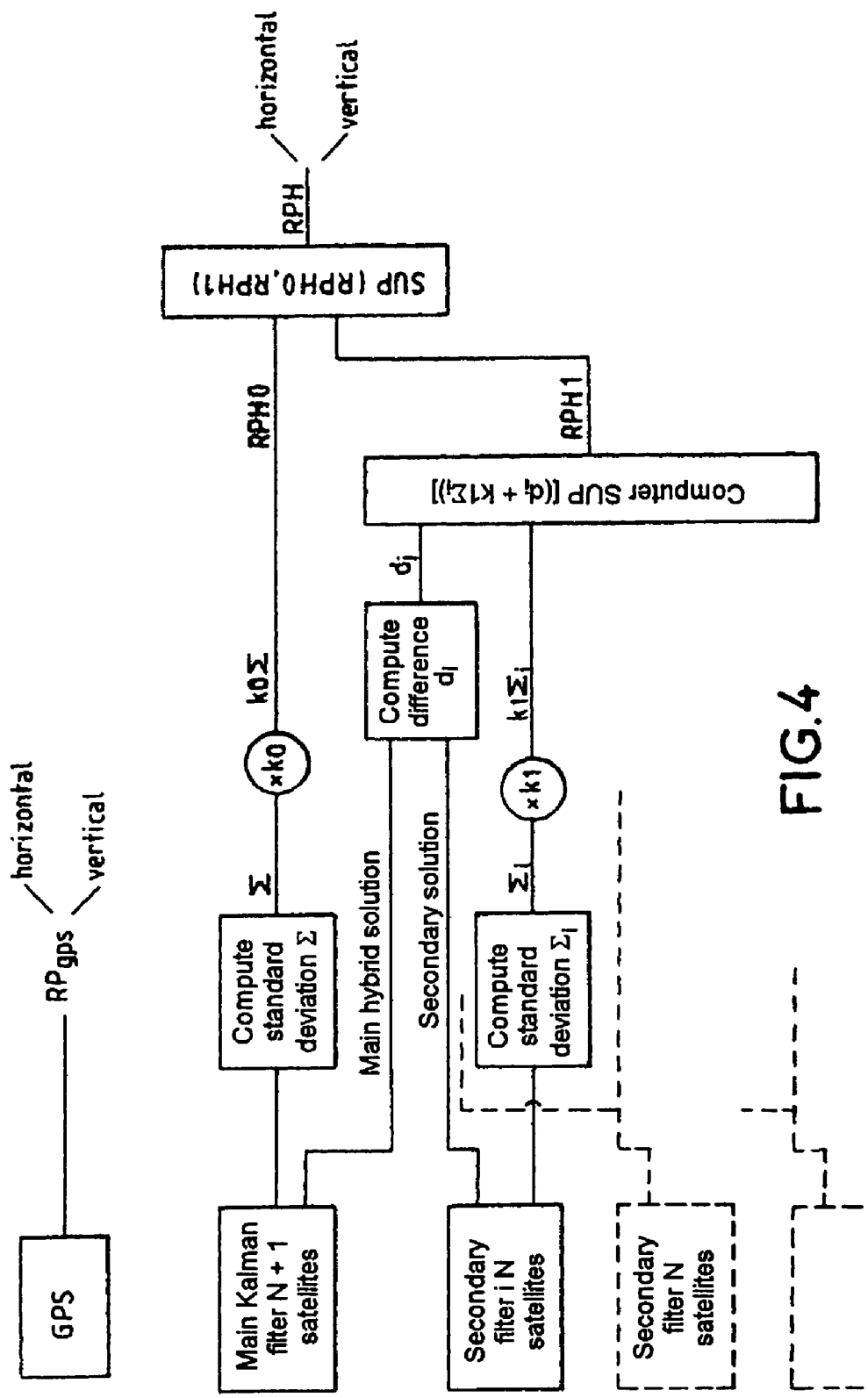
FIG. 4 represents the general architecture of the calculations of radii of protection.

FIG. 4 represents a diagram for obtaining the various protection radii computed in the hybrid inertial platform.

On the one hand the inherent radius of protection RPgps of the GPS receiver is computed (either in the GPS receiver itself or in the hybridization computer if the latter receives all the GPS receiver's internal data necessary for the computation of the protection radius: pseudo-distances $PD_i$, signal/noise ratios $(S/N)_i$ for each satellite axis, etc.). On the other hand, a hybrid protection radius RPH0 is computed by assuming that there is no defective satellite in the constellation of N satellites, observed at a given moment. Finally, a hybrid protection radius RPH1, corresponding to the presence of a defective satellite, is computed.

It is recalled that the radius of protection RP of a measurement, for a predetermined probability of nondetection of error PND, is an upper bound on the deviation between the value computed and the actual value of the quantity measured, such that there is a probability of less than PND that the actual value is more than a distance RP away from the computed value. There is therefore a maximum probability PND that the actual value is outside a circle of radius RP around the value found by computation: maximum probability PND that the actual error of measurement exceeds the stated radius of protection. This amounts again to saying that there is a maximum probability PND of being wrong in the determination of the protection radius.

In general, the maximum probability PND is fixed as a function of the application. In the example of the landing of an aircraft for example, one may desire a maximum probability PND of $10^{-7}$/hour of being wrong in the radius of protection on account of a foreseeable or unforeseeable defect.

Now, the protection radius is related directly to the variance of the quantity measured and to the probability of nondetection of error PND. The variance is the square of the standard deviation $\Sigma$ related to the quantity measured. The variance of the measured hybrid quantity is the coefficient of the diagonal of the covariance matrix P which corresponds to the measured quantity. If the altitude of the inertial platform is the measured quantity and is situated in sixth place in the state vector and in the variance matrix P, the variance of the altitude is the sixth coefficient in the diagonal of the matrix. The standard deviation $\Sigma$ is the square root of this variance. It is therefore deduced from the matrix P in a Kalman filter.

The protection radius RP is related to the standard deviation $\Sigma$ and the probability of nondetection PND by the following approximate table,

| Value of PND | Value of RP |
|---|---|
| 0.35/hour | $\Sigma$ |
| 5 $10^{-2}$/hour | $2\Sigma$ |
| $10^{-3}$/hour | $3\Sigma$ |
| $10^{-7}$/hour | $5.7\Sigma$ |
| $10^{-9}$/hour | $7\Sigma$ |

Depending on the probability of nondetection fixed (and hence depending on the application envisaged), it is therefore possible to determine a coefficient k such that the protection radius RP is equal to $k\Sigma$. The coefficient k takes a value lying between 1 and 7 in the above table.

This protection radius is computed from the standard deviations of the variables considered. It applies to each possible variable, but in practice one is interested in the distance variables.

A protection radius computation is done inside the GPS receiver so as to end up with an inherent radius of protection RPgps of the PVT point provided by the receiver. It is even possible to compute more specifically a vertical radius of protection for the altitude and a horizontal radius of protection for the position in terms of longitude and latitude, these radii not necessarily having the same value and not being used in the same way (the vertical radius of protection is a more critical item of data). The inherent radius of protection of the GPS is useful for the initialization or the reinitialization of the computation of hybridization between the inertial platform and the GPS receiver: the initial position of the inertial platform is assigned to be the value of the PVT point provided by the GPS, together with its inherent radius of protection.

Another protection radius computation is done within the hybridization computer, in the presence of errors modeled in the Kalman filter. More precisely two computations are done, one assuming an absence of satellite fault, and the other assuming the presence of a satellite fault; this leads to two hybrid radii of protection RPH0 (absence of fault) and RPH1 (presence of fault). The overall radius of protection will be regarded as being the larger of the two. It is not necessary to compute a protection radius in the case of two or more faulty satellites, the probability of this configuration occurring being regarded as too small.

As far as the protection radius RPH1 in the presence of a fault with a satellite is concerned, it should firstly be noted that in principle one knows the maximum probability of there being a defect of the spatial segment (defect with a satellite). Let us assume that it is $10^{-4}$/hour: this brings down the probability of having a defect in two satellites at once to $10^{-8}$/hour, which will be regarded here as negligible but which could be taken into account if one wanted to further reduce the probability of nondetection of error PND to below $10^{-7}$/hour. In what follows, a probability of nondetection of $10^{-7}$/hour will be regarded as a goal to be achieved whatever the configuration, fault or absence of fault.

However, this information regarding probability of fault of the spatial segment will be used to reduce the probability of nondetection of a fault other than a satellite fault simultaneously with a satellite fault.

In other words, if a satellite fault is present although such a fault occurs only with a probability of $10^{-4}$/hour, it will be considered that a probability of nondetection of $10^{-3}$/hour of an error other than this fault suffices in order for a probability of nondetection of $10^{-7}$/hour to be ensured overall. For a probability of $10^{-3}$/hour, the ratio k of the radius of protection to the standard deviation is only 3, whereas it is 5.7 for a probability of $10^{-7}$/hour.

In both cases, the computation of the protection radius involves the standard deviations of the position variables considered.

Computation of the Radius of Protection RPH0 in the Absence of any Satellite Fault The variance of a measured quantity, for example the altitude, is extracted from the updated covariance matrix Pa, its square root is taken so as to obtain the standard deviation $\Sigma_{alt}$ of the same quantity, the result is multiplied by the desired ratio k=k0 (for example k0=5.7) and the hybrid protection radius RPH0 (here for altitude: $RPH0_{alt}$) is obtained in the absence of any fault other than the errors modeled by the Kalman filter.

$$RPH0_{alt}=k0.\Sigma_{alt}$$

Without entering into the details, it is understood that if one prefers an overall horizontal radius of protection rather than a radius of protection for longitude and a radius of protection for latitude, the variances for longitude and for latitude must be added together to obtain an overall variance for horizontal distance and a horizontal standard deviation.

$$RPH0_{hor}=k0.\Sigma_{hor}$$

The radii of protection of quantities that are distances are obviously expressed as distances, the radii of protection of quantities that are speeds or angles are expressed as speeds or as angles.

This radius of protection is therefore derived directly from the successive updates of the covariance matrix P.

Computation of the Protection Radius RPH1 in the Presence of a Satellite Fault

As stated, if one wants an overall probability of overall nondetection of $10^{-7}$/hour (k=k0=5.7), if the probability of a satellite fault is $10^{-4}$/hour and if a case of satellite fault occurs, then the probability of simultaneous nondetection of an error in the hybridization computation process is considered to be $10^{-3}$/hour, corresponding to a coefficient k=k1=3.

The protection radius RPH1 which will be computed in this case results from the addition of two factors: a factor $k1.\Sigma$ related to the probability of nondetection of $10^{-3}$/hour for an error modeled in the Kalman algorithms, and deviations derived from the N+1 Kalman filtering algorithms.

It is recalled that the main filtering algorithm uses the N satellites, and that the other N filtering algorithms exclude a satellite of rank i on each occasion. These N secondary algorithms each lead to a hybrid position and to associated standard deviations for each variable (for example altitude and horizontal distances).

Specifically, in the case when no satellite is defective, the N+1 filtering algorithms provide hybrid positions that are very close to one another and all situated inside the protection radius RPH0 previously computed.

However, if a satellite is defective, the solutions provided by the N+1 filtering algorithms diverge and give N+1 different error estimates (that is to say N+1 different state vectors Xa). The hybridization computer computes the distances between the various solutions thus found. For example, if one is interested in the radius of protection of the altitude, the computer can compute the distances between the altitude solution provided by the main filter to N+1 satellites and the altitude solution provided by each of the N secondary filters.

Should there be a fault with a satellite, one of the secondary filters gives an exact solution within a radius of $k1.\Sigma_i$, $\Sigma_i$ being the standard deviation computed by this secondary filter and associated with the solution found by this filter.

All the other filters, including the main filter give a false solution, but one does not know which secondary filter is the one that gives the exact solution.

Hence, the distance $d_i$ between the altitude error (component of the state vector X) given by the main filter and that which is given by a secondary filter is computed, $k1.\Sigma_i$ is added to this distance, $\Sigma_i$ being the standard deviation corresponding to this filter. This computation is done for the N secondary filters. The maximum value out of the N values thus computed is taken, and this value constitutes the protection radius RPH1 in the event of a satellite fault.

$$RPH1\text{altitude}=SUP[(d_i+k1.\Sigma_i)]$$

The computation is similar for a horizontal radius of protection, the standard deviation considered then being the square root of the sum of the variances in longitude and in altitude.

Computation of the Overall Radius of Protection

Having thus computed two radii of protection RPH0 and RPH1, in the absence and in the presence of a fault of the spatial segment, the larger of the two values is taken to define an overall radius of protection RPH for the hybrid solution computed by the hybridization computer.

$$RPH=SUP[RPH0, RPH1]$$

This protection radius is computed as a vertical distance on the one hand, and as a horizontal distance on the other hand.

This hybridization between a single inertial platform and a GPS receiver does not allow account to be taken of any unmodeled fault with the inertial platform or with the GPS receiver (for example a GPS fault affecting all the channels of the receiver).

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

If one wants to take such faults into account, a redundancy must be introduced, with a second inertial platform, a second GPS receiver and a second hybridization computer. The first hybridization chain provides a first hybrid solution which will be considered to be the main solution, with an associated standard deviation $\Sigma$; the second chain provides a hybrid solution with an associated standard deviation. If the probability of a hardware fault is considered to be $10^{-4}$/hour, then a radius of protection of $3\Sigma$ around each hybrid solution is sufficient. The distance between the two hybrid solutions is computed, one being right within a radius of $3\Sigma$ and the other being false, the larger of the two $3\Sigma$ values being added to this distance; the sum thus computed constitutes an overall radius of protection of the main hybrid solution in the presence of a fault with one or the other of the chains: the exact solution lies inside a circle having this radius, around the main hybrid solution, with an error probability of $10^{-3}$/hour in this example.

Given that the main hybrid solution itself has an associated radius of protection, in the absence of a fault, which is $5.7\Sigma$ for the desired overall probability of $10^{-7}$/hour, one determines which is the higher radius of protection out of the latter and the overall radius of protection in the presence of a fault with one or the other of the chains. The higher of the two values constitutes, for the hybridized platform with two hybridization chains, the overall radius of protection around the hybrid solution of the main chain. It is this overall radius of protection that is provided to the user.

It will be noted that it is not possible to determine which of the two chains is defective if there is no third pathway. This is why the user is given a single hybrid solution which is that of the chain considered by assumption to be the main chain (each of the two chains may be considered as the main one if the chains are identical).

The explanations just provided show that the protection radius thus computed varies gradually: there is no abrupt jump, either in the case of a single hybridization chain or in the case of redundancy with two chains.

The inherent radius of protection of the GPS may be used to reset the hybrid data: when the inherent radius of protection of the GPS becomes less than the overall radius of protection of the hybrid platform, the position data of the GPS may be provided as output data from the hybrid platform.

Returning now to the case of a spatial segment fault, caused by a defective satellite, it is desirable to be able to ascertain the identity of the defective satellite, and to exclude this satellite from the subsequent measurements. In the case of two hybridization chains, it will be verified that it is the same satellite that is identified as being defective before excluding it.

To perform this exclusion, it is best to consider the innovations (INNOV) of the Kalman filters as gaussian variables in the absence of any fault; the sum of the squares of the innovations of each of the filters is computed periodically, and is normalized by the associated standard deviations which may vary from one filter to another. A Khi2 law is applied to these sums. No inconsistency should be seen to appear. If an inconsistency appears, it appears in principle on all the filters except the one which does not use the defective satellite. It can thus be identified, excluded from the subsequent computations, and the hybrid data can immediately be reset to the data provided by the secondary Kalman filter which does not include the defective satellite. The inconsistency is determined on the basis of a threshold which depends on the false alarm probability and the nondetection probability fixed.

The invention is applicable in the case of the use of DGPS receivers, that is to say of receiver receiving, in addition to the satellite signals, correction signals sent by local ground stations which receive the same signals from satellites and whose exact position is known. The ground station sends corrections of pseudo-distances and it is the pseudo-distances $PD_i$ thus corrected which serve for the initialization of the hybridization, the Kalman filter then being fed with carrier phase variations as has been explained.

What is claimed is:

1. A navigation system, comprising:
   an inertial navigation platform hybridized with at least one satellite based positioning receiver, the inertial platform providing position information resulting at least in part from accelerometric and gyrometric measurements, and the receiver providing pseudo-distances representing the distance between the receiver and satellites, the receiver comprising, for each channel of the receiver, a digitally phase controlled oscillator slaved to the phase of a carrier of a satellite signal corresponding to this channel;
   wherein the navigation system provides hybrid position values resulting from a combination of numerical position data originating from the platform and numerical data originating from the receiver;
   a means of estimating a new hybrid position on the basis of an observed deviation between pseudo-distances measured by the receiver between the receiver and each one of said satellites and corresponding distances computed by the inertial platform between the platform and said each one of said satellites, this means comprising a digital filter, of Kalman filter type, allowing the prediction of a deviation and the matching of the filter as a function of the comparison between the observed deviations and predicted deviations;
   wherein in the digital filter, the distance increment from one measurement instant to the next instant, between a pseudo-distance previously measured by the receiver on a satellite axis and a new pseudo-distance measured by the receiver on said satellite axis, is the phase variation of the digital oscillator between the two measurement instants, this variation being referred to distance along said satellite axis.

2. The navigation system as claimed in claim 1, wherein the estimating means also provides a protection radius associated with the hybrid position found, this protection radius being calculated on the basis of variance data produced in the Kalman filter thus incremented.

3. A method of estimating position using a navigation system having an inertial navigation platform hybridized with at least one satellite based positioning receiver, the inertial platform providing position information resulting at least in part from accelerometric and gyrometric measurements, comprising the steps of providing pseudo-distances representing the distance between the receiver and satellites; the receiver comprising, for each channel of the receiver, a digitally phase controlled oscillator slaved to the phase of a carrier of a satellite signal corresponding to this channel; providing hybrid position values resulting from a combination of numerical position data originating from the platform and numerical data originating from the receiver; estimating a new hybrid position on the basis of an observed deviation between a pseudo-distances measured by the receiver between the receiver and each one of said satellites and a corresponding distances computed by the inertial platform between the platform and said each one of said satellites, predicting a deviation and the matching of the filter as a function of the comparison between the observed deviations and predicted deviations; calculating a distance increment which is a phase variation of said digital oscillator between one measurement instant and a next measurement instant, this variation being referred to distance along a satellite axis, and adding this increment to a pseudo-distance measured by the receiver on a satellite axis at said one measurement instant to obtain a new pseudo-distance on said satellite axis, and using said new pseudo-distance to compute said observed deviation at said next measurement instant.

4. The method as claimed in claim 3, providing a protection radius associated with the hybrid position found, this protection radius being calculated on the basis of variance data produced in the Kalman filter thus incremented.

* * * * *